May 27, 1952 G. L. HELLER 2,597,991
CARBON BLACK MANUFACTURE
Filed July 3, 1948 4 Sheets-Sheet 1

INVENTOR
GEORGE L. HELLER
BY
ATTORNEYS

May 27, 1952      G. L. HELLER      2,597,991
CARBON BLACK MANUFACTURE
Filed July 3, 1948      4 Sheets-Sheet 2
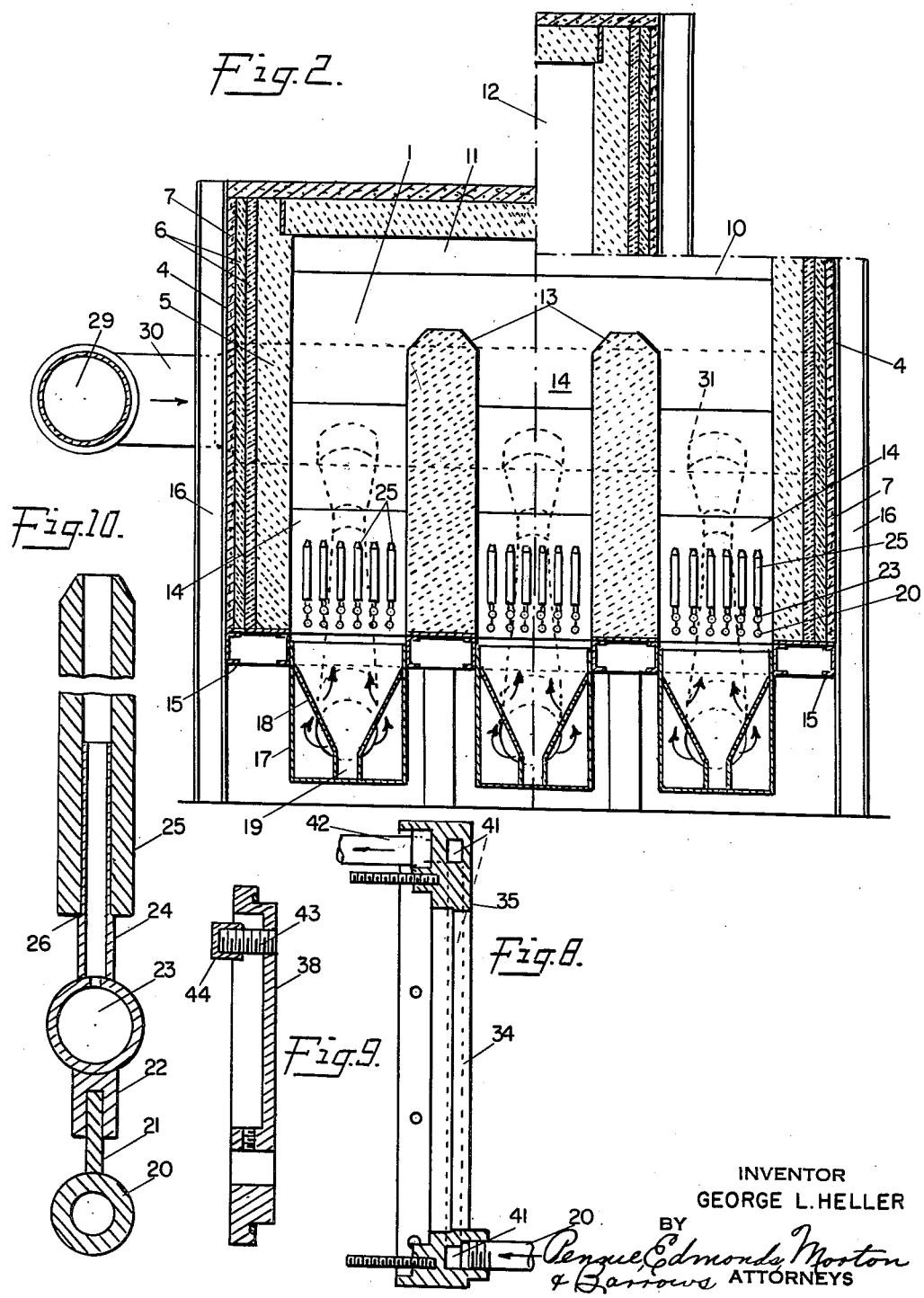
INVENTOR
GEORGE L. HELLER May 27, 1952  G. L. HELLER  2,597,991
CARBON BLACK MANUFACTURE
Filed July 3, 1948  4 Sheets-Sheet 3
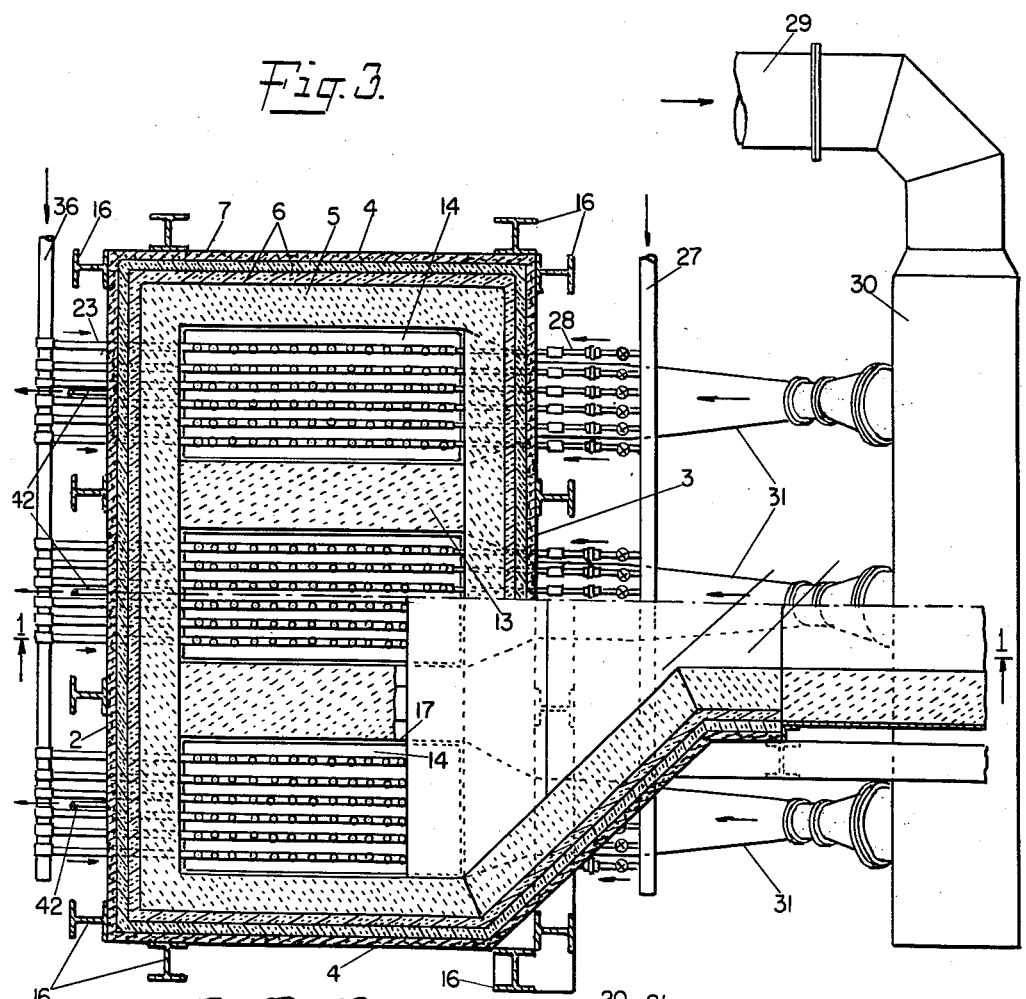
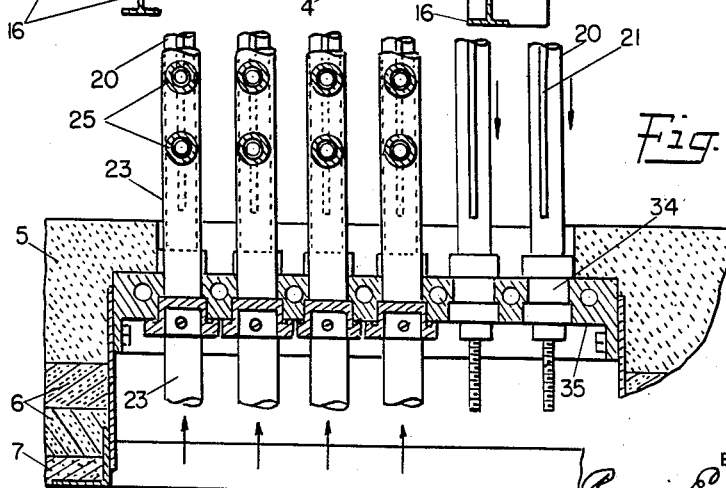
INVENTOR
GEORGE L. HELLER
BY
Pennie, Edmonds, Morton
& Barrows ATTORNEYS May 27, 1952  G. L. HELLER  2,597,991
CARBON BLACK MANUFACTURE
Filed July 3, 1948  4 Sheets-Sheet 4
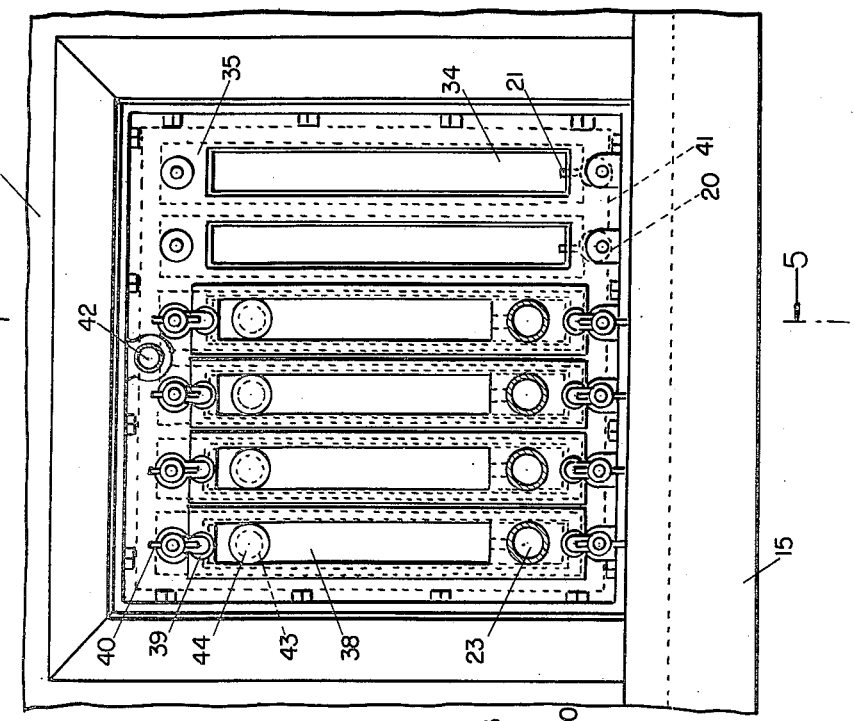
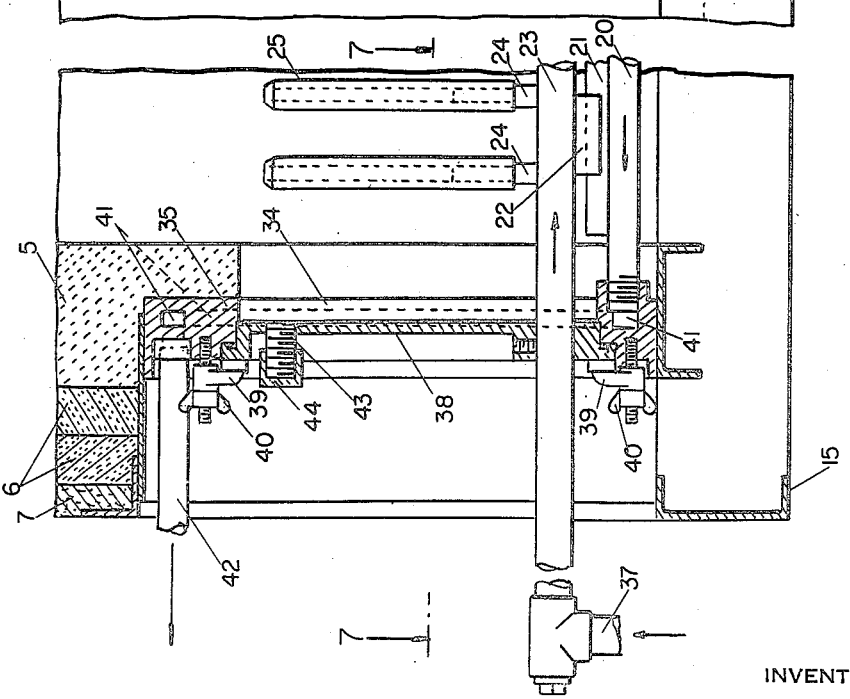
INVENTOR
GEORGE L. HELLER
BY
Pennie, Edmonds, Morton & Barrows
ATTORNEYS Patented May 27, 1952

2,597,991

UNITED STATES PATENT OFFICE 2,597,991

CARBON BLACK MANUFACTURE

George L. Heller, Monroe, La., assignor to Columbian Carbon Company

Application July 3, 1948, Serial No. 37,023

3 Claims. (Cl. 23—209.8)

This invention relates to a novel process for the production of carbon blacks. It is especially applicable to the production of so-called high-structure furnace carbons, but is also useful in the production of other types of furnace blacks.

All carbon blacks are composed of extremely finely divided particles consisting primarily of carbon in some form or forms not fully understood. They vary widely as to their physical and chemical properties, including surface areas, and their influence upon compositions with which they are compounded, for instance, natural and synthetic rubbers, inks, lacquers, and the like.

Carbon pigments generally are formed by thermal decomposition of hydrocarbons brought about by their partial combustion, or by heating them by some other means to the decomposition temperature of the hydrocarbons without substantial combustion thereof. The particular characteristics, that is, combined physical and chemical properties, of carbon blacks appear to be influenced largely by the environment in which the particles are formed, the nature of the raw materials decomposed to form the carbon particles and the period of exposure to reaction temperatures following liberation of the carbon particles.

Though the art has generally recognized that these factors influence the character of the product, it has not been possible to vary at will the combined physical, chemical and compounding characteristics of the carbon black product. The art has been highly empirical.

It has more recently been discovered that an important factor in determining the rubber compounding characteristics of a carbon black is the environment of the hydrocarbons immediately prior to the carbon-forming decomposition reaction. It has been found, for instance, that the character of the product is markedly influenced by preheating the hydrocarbons to a temperature at which a partial pyrolysis is effected prior to the carbon-liberating decomposition. The use of highly unsaturated hydrocarbons of the olefinic, acetylenic or aromatic types has been found to be particularly useful as raw material for carbon formation and also to exert a marked effect upon the final properties of the product. By use of the present process, the conversion of gaseous saturated hydrocarbons to these unsaturate forms is accomplished in an uninterrupted process initiated within the burner tube and completed within the flame sheath directly above the burner.

The process of the present invention is particularly adapted to utilize this principle of partial pyrolysis prior to the carbon-forming decomposition of the hydrocarbons to a greater extent than heretofore possible in practical operation and, in conjunction with a novel combination of other operating conditions, so as to effect a smooth, uniform, highly efficient and continuous production of furnace carbons with a minimum of operating difficulties.

In general, the process comprises the burning of a gaseous hydrocarbon with a restricted amount of air as a plurality of relatively small free flames in an unobstructed, highly heated chamber as it flows vertically from the upper ends of relatively small vertically positioned tubes, herein referred to as burner tubes, projecting a substantial distance upwardly through the chamber and exposed to direct radiant heat from the highly heated chamber walls, the air for supporting partial combustion of the hydrocarbons flowing upwardly around and between the burner tubes.

The velocity of flow of the gaseous hydrocarbons through the burner tubes is such as to provide sufficient time for the hydrocarbons to become highly heated, to a temperature at which pyrolysis is initiated. But the time and temperature factors should be so correlated that there is no appreciable carbon liberation within the burner tubes.

The time and temperature factors are, to a considerable extent, interdependent, a longer time factor being permissible at lower temperatures. Optimum time and temperature factors will vary somewhat with different hydrocarbons and also depending upon the desired characteristics of the product. However, it is necessary that the hydrocarbon gas be heated to an active conversion temperature before it issues from the respective burner tubes into the chamber atmosphere and that the heating be rapid.

The necessary rapid heating is effected, in accordance with my present process, by passing the hydrocarbon gas through tubes of relatively small inside diameter, of sufficient length and so positioned with respect to the chamber walls as to be exposed to intense radiant heat from the walls and radiant flames. The respective streams of hydrocarbons are preheated to temperatures above 1400° F. and normally from 1600° F. to 2400° F. within the burner tube wherein the pyrolysis reaction is initiated and rapidly completed within a sheath of flaming gas above the burner and out of contact with any solid wall.

Air is introduced into the lower end of the chamber below the burner tubes and distributed uniformly over the transverse area of the furnace chamber and is caused to flow slowly and uniformly upwardly around the respective burner tubes and the flames surmounting the tubes with a minimum of turbulence. The velocity of this upwardly flowing air current must be so correlated with the velocity of the gas streams as to preserve the integrity of the respective flames and promote steady non-flickering flames. In general, the velocity of the gas stream feeding the flames should be in excess of the velocity of the air, advantageously at least 12 times that of the surrounding air, as determined by calculation at 60° F. and 30 inches of mercury, absolute pressure. The air velocity is far less than that used in conventional furnace processes and, in general, should be of the order of 1 to 3 feet per second, or even as low as one-half foot per second. As the slow moving current of air moves upwardly through the furnace chamber, it also becomes highly preheated to about 1600° F., or higher, and may, with advantage, be preheated to as high as 2300° F., depending upon other operating conditions, before contacting the hydrocarbon gas.

By maintaining the hydrocarbon velocity 12 times or more that of the surrounding air and using spacings as hereinafter described, the hydrocarbon issues as an expanding jet of about 10° angle and inspirates small percentages of air along its interface forming a relatively viscous flame sheath of high temperature causing rapid completion of the pyrolysis reactions within the sheath. The expansion of the flame permits thermal and mechanical dilution to proceed naturally as the reactions are completed thereby avoiding further deposition upon the formed carbon pigments and preserving the high quality. Complete diffusion of the flame into a uniform furnace atmosphere appears complete at a distance of 18 to 30 inches above the burner tubes.

I have found that, by preheating the hydrocarbons as described, I obtained greater flame-stability and this, in conjunction with the air-gas velocities and relative velocities just described, results in flames of remarkable stability, uniformity and integrity.

I have further found that the fineness of subdivision of the incoming gaseous hydrocarbons, that is, the inside diameter of the burner tubes, materially influences the uniformity of the reaction, the rapidity of heat transfer and the characteristics of the product. Reduction in diameter of the gas streams favors greater uniformity of the reaction, more rapid heat transfer and smaller particle size of the resultant carbon black. Burner tubes having an inside diameter of ½ inch have been used with particular advantage. However, burner tubes having inside diameters as great as 1 inch and as small as 3/32 inch have been used successfully. With the smaller burner tubes, the preheating time and temperatures are more critical as the tolerance for carbon formation in the burner tubes is somewhat less.

The composition and thickness of the burner tube walls are also important considerations since they influence the rate of absorption of radiant heat and the transmission of the heat to the gas stream. The tubes must be capable of withstanding the extremely high temperatures without cracking or deformation. Refractory tubes composed primarily of silicon carbide and those of mullite or alumina and the like have been successfully employed.

Optimum burner tube length will depend upon the extent of preheating and extent of pyrolysis desired in a particular operation, the contemplated gas velocities through the tubes, the inside diameter of the particular tubes and the rate of absorption of radiant heat. Tubes of 6 inches to 12 inches in length have been successfully used, but tubes of even greater length may be employed.

Burner tube spacing has also been found to influence the character and yield of the resultant product. In general, the tubes should be so arranged as to be exposed as uniformly as is practical to heat radiation. This is facilitated by the use of relatively narrow furnace chambers or ducts so as to minimize the differences in distance of the respective tubes from the furnace walls and by so constructing the furnace roof as to promote the reflection of radiant heat therefrom onto the burner tubes. To this end, it has been found more advantageous to use in the process a number of smaller furnaces or to employ a number of relatively small furnace ducts confined by refractory, heat reflecting walls rather than to employ a single large chamber. Advantageously, the furnace chamber, or ducts, should be about 2 feet in width but may be of somewhat greater length.

The process is particularly applicable to the use of hydrocarbons of high B. t. u. content, for instance, natural gas containing hydrocarbons of higher molecular weight than methane. Natural gas enriched by the addition of normally liquid hydrocarbons, especially of an aromatic petroleum fraction, has been used with particular advantage. It has previously been proposed to use such enrichment in conjunction with other processes, especially where furnace blacks of high structure index are desired. However, an advantage of my present process is that I can thereby produce high structure blacks without resorting to the use of enriching oils. The process is also particularly adapted to operations in which the hydrocarbons are diluted by steam, especially in conjunction with oil enrichment of lean hydrocarbons, such as of natural gas.

Reference herein and in the appended claims to gaseous hydrocarbons or hydrocarbon gas will be understood to include normally gaseous hydrocarbons, natural gas, for instance, consisting essentially of methane, and also such hydrocarbons enriched by the presence of hydrocarbons of higher molecular weight. Such enriching hydrocarbons should have an end point not in excess of about 700° F.

In referring herein to structure characteristics of the furnace carbons, I mean the tendency toward a chain or network structure between the colloidal carbon particles due to adherence or attractive forces of such strength as will survive rubber milling operations.

The air-gas ratio may be varied somewhat provided proper precautions be taken as to the air and gas velocity ratios. Air-gas ratios of 4:1 to 6.5:1 have been found especially advantageous. Air-gas ratios within the range of 3.5:1 to 7:1 may be successfully employed, varying with the B. t. u. value of the gas and the furnace size.

The invention will be further described and illustrated with reference to the accompanying drawings of an apparatus especially adapted to the carrying out of the process and which is the subject of my copending application, Ser. No. 37,024, filed concurrently herewith, of which Figure 1 is a side vertical sectional elevation through lines 1—1 of Fig. 3;

Fig. 2 is an end sectional elevation, the left side of which is along lines A—A of Fig. 1 and the right side along lines B—B of Fig. 1.

Fig. 3 is a horizontal sectional view, the upper half of which is along lines C—C of Fig. 1, and the lower half, along lines D—D of Fig. 1;

Fig. 5 is a fragmentary detailed side vertical sectional view including a furnace door assembly along lines 5—5 of Fig. 6;

Fig. 6 is a somewhat enlarged front elevation of one section of the furnace, also including a furnace door assembly;

Fig. 7 is a fragmentary horizontal section along lines 7—7 of Fig. 5;

Fig. 8 is a detailed sectional view of the door frame;

Fig. 9 is a detailed sectional view of the door, and

Fig. 10 is a detailed front vertical sectional view, somewhat enlarged and fragmentary, of the burner assembly.

Figure 1:
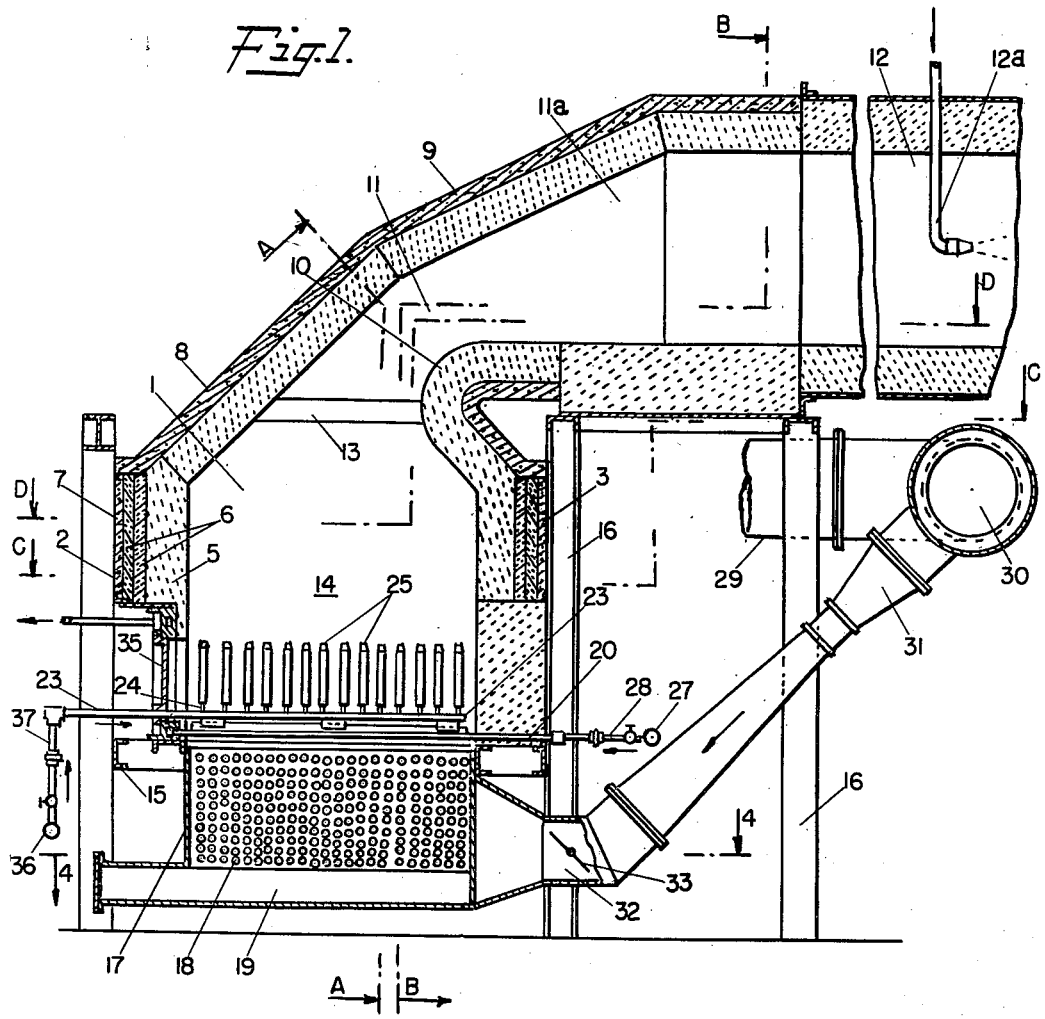
Figure 4:
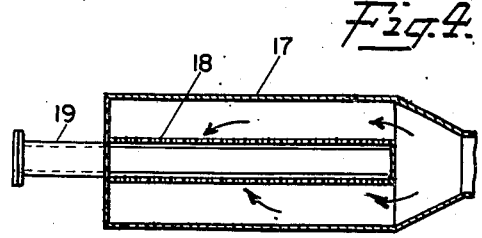
Fig. 4 is a horizontal sectional view along lines 4—4 of Fig. 1.

Referring more particularly to Figs. 1, 2, and 3, the apparatus comprises a furnace chamber 1 having a front wall 2, a rear wall 3 and side walls 4 constructed of a furnace lining of firebrick 5, or other suitable furnace refractory, covered on the outside by two layers of heat insulating material 6 encased in a hard air-tight cement coating or preferably sheet metal casing 7, as more clearly appears from Figure 5. The upper end of chamber 1 is partially closed by the suspended roof members 8, and 9 and shoulder 10 forming a throat 11 which opens through breeching 11a into conduit 12 leading to conventional cooling and collecting apparatus.

As more clearly appears from Figure 2, the chamber 1 is divided by partitioning walls 13 extending from the front wall 2 to the rear wall 3 and constructed of firebrick to form three relatively narrow furnace ducts 14, each communicating at its upper end with the upper portion of chamber 1. These inner walls 13 and also the outer walls of the furnace are supported by horizontal channel irons 15 which, in turn, are supported by vertical structural steel members 16.

The ducts 14 extend downwardly beyond the furnace walls, the lower ends thereof being enclosed by a metal casing 17. The lower ends of the ducts are partitioned by inclined perforated metal plates 18, extending from front to rear of the ducts and forming a trough-shaped partition opening at its lower end into a cleanout conduit 19.

Positioned in the respective ducts above the perforated plates are a plurality of tubular supporting members 20 extending horizontally from the front to the rear of the duct, the respective members being parallel and adapted to be water cooled, each being provided with an upwardly extending flange 21, adapted to engage flange 22, extending downwardly from the burner pipe manifold 23, as more clearly appears from Fig. 10 of the drawing.

Spaced along manifold 23 are upwardly extending nipples 24 turned at their upper ends to fit into removable burner tubes 25 and to form a shoulder 26 for supporting the burner tube. Water, or other cooling fluid, is supplied to the supporting members 20 through manifold 27 and valved connecting lines 28 to avoid overheating and sagging of the supporting member.

Air for supporting the partial combustion of the hydrocarbon is supplied under pressure from conventional blower through air duct 29 to manifold 30. From manifold 30, the air passes through the Venturi tubes 31 and connection 32 into the lower end of the ducts 14 beneath the perforated partitions 18. The Venturi tubes are provided with conventional equipment not shown for measuring the amount of air passed therethrough and the connections 32 are equipped with dampers, such as indicated at 33, for regulating and controlling the amount of air passed to the respective ducts 14.

In the particular apparatus shown, each of the three furnace ducts 14 is provided with six burner manifolds 23, each provided with fourteen burner tubes 25 and each individually supported by a supporting member 20. The burner manifolds project through narrow slots 34 in the doors 35 in the forward end of the respective furnace ducts 14, as more clearly appears from Figs. 1, 5, and 6. The first two slots from the right of the Figure 6 are shown with the burner assemblies removed, the slots being open. The remaining slots are shown with the burner assemblies in place and the slots closed by the closure members 38. The respective burner manifolds 23 are connected with gas supply manifold 36 by valved connection 37, each equipped with a union so that the connection may be readily broken.

The slots 34 in the doors of the respective furnace ducts are of sufficient height that once the connection 37 has been broken, an individual burner assembly including the burner manifold and the burner tubes may be withdrawn from the furnace duct intact through the slots for cleaning or replacement of burner tubes without disturbing the operation of the process. Under normal conditions, the slots 34 will be closed by the member 38 which is held in place by the lug 39 and the wing nut 40. This door assembly is also water cooled, cooling water flowing through supporting members 20 passing through ducts 41 in the door frame and, from thence, through conduit 42 leading to a manifold not shown. Each of the closure members 38 is provided with a peephole 43 through which operation of the burner may be observed and which will normally be closed by cap 44.

In carrying out the process, natural gas, or other gaseous hydrocarbon, either enriched or unenriched and undiluted or diluted by steam, is supplied through gas manifold 36 and branch connection 37 to the respective burner manifolds 23. From the burner manifolds, the gaseous hydrocarbon passes upwardly through the respective burner tubes, is ignited as it flows from the upper end thereof and is burned as a quiescent vertical flame. The gaseous hydrocarbon may be preheated by conventional means before being passed into the manifold 36. However, it should not be preheated to a temperature sufficiently high to cause such decomposition of the hydrocarbon as might result in the coking or plugging of the tubes, generally not in excess of say 500° F. Where enriching oil is mixed with the gas, the oil used should have an end point not in excess of about 700° F., and, usually, the mixture should be preheated to a temperature in excess of its dew point.

Air for supporting the partial combustion of the gaseous hydrocarbon is supplied in measured quantity through the Venturi tubes 31 to the lower end of the furnace ducts 14 beneath the perforated plates and passes upwardly through the perforations in the plates, thereby being distributed uniformly through the transverse area of the furnace ducts. The arrangement of these perforated plates is such that any carbon, furnace scale, or other solid falling downwardly through the furnace will slide downwardly over the perforated plates into the conduit 19 thus avoiding clogging of the perforations.

The amounts of air and gas will be so regulated and proportioned as to cause their velocities to fall within the previous specified ranges. As the operation proceeds, the walls and roof members of the furnace chamber will become highly heated and will radiate heat to the furnace tubes 25 thereby preheating the gaseous hydrocarbons flowing therethrough to the desired temperature. The air flowing upwardly around the burner tubes will likewise be highly preheated, as previously described.

The gas issuing from the upper end of the respective burner tubes, under normal operations, will burn to produce a flame about 12 to 24 inches high, the lower end of which for the first three inches or so is usually a deep blue, above which there is a bright yellow zone in which the carbon particles appear to be rapidly formed in suspension. The temperature rises rapidly for a flame travel of from 12 to 24 inches above the burner tubes and thereafter decreases as heat of reaction is absorbed and dilution effects occur. The entire flame reaction appears to be complete within a distance of 30 to 36 inches from the burner tip and the flames merge into a uniform atmosphere of reduced temperature thus aiding in the preservation of product quality. The resultant furnace gases with carbon particles suspended therein, pass through the throat 11 into the conduit 12 and, from thence, to conventional cooling and collecting apparatus. It is generally advantageous to provide water sprays, or the like, along conduit 12, as indicated at 12a, for the purpose of reducing the temperature of the suspension as is understood by the art.

The spacing of the burner tubes may be varied somewhat and I have found that the burner tube spacing definitely influences the characteristics of the furnace black product and optimum operating conditions, generally, for the production of a particular product. I have successfully used burner tube spacings ranging from 1½ inches between centers to as high as 8 inches between centers. I have found, however, that where the burner manifolds are spaced apart, distances in the upper end of this range and the burner tubes on the respective burner manifolds are spaced like distances between centers, it is desirable to stagger the burner tubes on adjacent burner manifolds so as to give a more even distribution of the burner tubes over the transverse area of the furnace chamber. Such greater spacing of the burner tubes is usually desirable only where tubes of larger inside diameter, for instance, 1 inch, are used.

Generally, tube spacings within the lower end of the indicated range have been found to be more advantageous with respect to uniformity of operation. This is true both with respect to the spacing of the burner tubes on the individual burner manifolds and also the distance between adjacent manifolds. However, as previously noted, optimum burner tube spacing is, to a considerable extent, dependent upon the inside diameters of the burner tubes. Expressed as the ratio of tube spacing between centers to the inside diameter of the respective tubes, I have, with advantage, used tube spacings ranging from about 3.4:1 to 8.25:1. However, tube spacing equal to 6 to 8 times the inside diameter of the burner tubes has been found especially advantageous.

Specific examples of particular combinations of the number of tubes, inside diameters of the tubes and lengths of the burner tubes and the spacing between centers of the tubes which have been used with advantage are set forth in the following Table I.

*Table I*

| No. of tubes | Tube Diameters | Tube Lengths | Tube Spacing |
| --- | --- | --- | --- |
| | Inches | Inches | |
| 121 | 7/32 | 6 | 1½" x 1½". |
| 528 | 7/32 | 6 | 1½" x 1⅝". |
| 120 | ½ | 12 | 3¼" x 3¼". |
| 100 | 1 | 9 | 4" x 4". |
| 50 | 1 | 9 | 8" staggered. |
| 30 | 1 | 9 | 7" x 8¼". |
| 16 | 1 | 9 | 4" x 6". |
| 231 | 7/32 | 6 | ¾" x 1½". |
| 81 | ½ | 12 | 1⅜" x 2". |
| 49 | ½ | 12 | 1⅜" x 2". |
| 25 | ½ | 12 | 3¾" x 4". |
| 16 | ½ | 12 | 4" x 4". |
| 102 | ½ | 12 | 3¼" x 3½". |
| 25 | ⅝ | 12 | 3¾" x 3¾". |
| 25 | ⅝ | 12 | 3¾" x 3¾". |
| 10 | 3/32 | 12 | 4" x 4". |
| 36 | 1 | 12 | 5½" x 3¼". |

In the particular apparatus shown in the drawing, the throat through which the furnace gases leave the furnace chamber is 1 foot 5 3/16 inches across and extends the full width of the chamber 1, opening into the breeching leading to the conduit 12, the latter being 3 feet in diameter.

The process will be further described and illustrated by the following specific examples of operations carried on in apparatus such as just described and represented by the drawings. It will be understood, however, that the process is not restricted to the particular conditions of these examples. Operating conditions and the characteristics of the resultant products are set forth in the following Table II.

*Table II*

| Run No. | 1 | 2 | 3 | 4 | 5 | 6 | 7 |
| --- | --- | --- | --- | --- | --- | --- | --- |
| Air-gas ratio | 4.29 | 3.9 | 4.3 | 4.18 | 5.75 | 5.6 | 4.8 |
| Type of gas, B. t. u./cu. ft. | 1,000 | 1,190 | 1,150 | 1,160 | 1,200 | 1,200 | 1,100 |
| Oil Enrichment, gals./M cu. ft. of gas | none | 1.57 | none | 1.28 | 1.80 | 2.0 | 1.20 |
| Steam dilution, weight per cent of gas | none | none | none | none | 40 | 25 | none |
| Gas preheated to, °F | 540 | 585 | 600 | 600 | 500 | 500 | 450 |
| Air velocity—ft./sec. | 1.03 | 1.06 | 1.01 | 1.11 | 1.40 | .552 | .732 |
| Gas velocity—ft./sec. | 15.2 | 16.7 | 14.5 | 29.6 | 33.8 | 13.7 | 25.3 |
| Velocity ratios—gas/air | 14.8 | 15.7 | 14.4 | 26.7 | 24.1 | 24.8 | 34.5 |
| Tube time—secs. | .0178 | .0153 | .0186 | .0091 | .0046 | | |
| Furnace time—sec. | 1.99 | 1.94 | 2.02 | 1.85 | 1.04 | | |
| Furnace throat temp., °F | 2180 | 2250 | 2005 | 2,140 | 2,265 | | |
| Yield—lbs./M cu. ft. | 4.6 | 10.9 | 9.8 | 9.8 | 4.8 | 3.4 | 7.8 |
| Character of Product: | | | | | | | |
| Color—A. B. C. | 90 | 77 | 882 | 85 | 113 | 134 | 86 |
| Oil absorption—gals./100 lbs. | 13.8 | 14.8 | 14.4 | 16.2 | 16.7 | 14.0 | 20.9 |

The air and gas velocities given in the foregoing table were calculated for volumes at 60° F. and 30 inches of mercury absolute pressure. The tube time, i. e., the time in passing through the burner tubes was calculated for a mean temperature of 1460° F. The furnace time, or so-called contact time, was calculated using an average temperature of 2250° F. and represents the time required for the gas to pass through the furnace from the burner tube tips to the first water spray in conduit 12.

The calculations of gas velocities are based on the volume of the hydrocarbon gas, natural gas being used in each instance, plus the volume of enriching oil vapors and steam where employed, each gallon of enriching oil being assumed to be the equivalent of 18.2 cubic feet of vapors for paraffinic oils, such as diesel oil.

The B. t. u. values given are those of the natural gas plus the enriching oil, where used. The gas preheat temperatures given are those of the gas passed to the system prior to preheating in the furnace tubes. The values given for color of the resultant products were determined by the process described in an article by C. W. Sweitzer and W. C. Goodrich, entitled "The Carbon Spectrum for the Rubber Compounder," appearing in Rubber Age, vol. 55, No. 5, of August 1944, pp. 469–78. The values for oil absorption were determined by the stiff paste method also described in the above noted article.

The first three runs were made in a furnace equipped with 306 silicon carbide burner tubes of ½ inch inside diameter and 12 inches long, the distance between centers of the tubes being 3 inches by 3½ inches. In run #4, the same number and arrangement of tubes were used but the tubes were only ⅜ inch inside diameter composed of mullite. In run #3, the enriching oil used was a petroleum distillate, primarily paraffinic in nature and having an end point of 668° F. In runs #2 and #4, the enriching oil was a highly aromatic petroleum distillate having an end point of 638° F.

The furnace employed in each of the first four runs was a single chamber furnace 3 feet 9 inches square, the furnace volume measured to the breeching being approximately 200 cubic feet and the volume of the breeching, including the conduit leading therefrom up to the point of the first water spray cooler, was 177 cubic feet.

Run #5 was made in a furnace substantially as shown in the present drawings, composed of three furnace sections, or ducts, each 2 feet wide and 4 feet 6 inches deep. All told, 528 burner tubes $\frac{7}{32}$ inches I. D. were employed, each 6 inches long. The furnace volume measured to the breeching was 67 cubic feet and the volume of the breeching, measured to the first water spray, was 34.6 cubic feet, the enriching oil used being a petroleum distillate composed primarily of paraffinic constituents.

Runs #6 and #7 were made in a small furnace chamber 21 inches square. The volume of the furnace measured to the breeching was 15.8 cubic feet and the volume of the breeching, measured to the water spray, was 11.4 cubic feet. In run #6, this chamber was equipped with 36 burner tubes composed of mullite, each ⅜ inch I. D., spaced apart 2¾ inches between centers and 12 inches long. In run #7, the number of tubes was reduced to 25 and they were of ⅜ inch I. D. mullite and were spaced 3¾ x 4 inches between centers. The enriching oil used in run #6 was a petroleum distillate marketed as ordinary diesel engine fuel and that used in run #7 was a highly aromatic petroleum distillate.

I claim:

1. The process for the production of carbon black by the partial combustion of hydrocarbons which comprises heating the hydrocarbon to a conversion temperature in excess of 1400° F., but not substantially higher than 2400° F., by flowing it in gaseous form out of contact with oxygen upwardly as a plurality of confined streams of a diameter within the range of $\frac{3}{32}$ inch to 1 inch through the lower portion of a highly heated furnace chamber, uniformly spaced over the transverse area of the chamber and spaced apart a distance between centers equal to 3.4 to 8.25 times the diameter of the respective streams, slowly flowing air upwardly around, but out of contact with, the gas streams at a velocity not in excess of 3 feet per second and without substantial turbulence in an amount sufficient to effect only partial combustion of the gaseous hydrocarbon and effecting a partial pyrolysis and partial combustion of the resultant hydrocarbon by flowing the preheated gas streams upwardly in contact with the rising current of air at an initial velocity not less than 12 times the velocity of the rising air current, while preserving the integrity and stability of the respective gas streams, and thereafter completely diffusing the gas streams in the furnace atmosphere, thereby forming carbon particles in gaseous suspension, passing the resultant carbon particles from the furnace chamber in suspension in effluent furnace gases and cooling and collecting the resultant carbon black.

2. The process of claim 1 in which the rising current of air is preheated to at least 1400° F. before contact with the hydrocarbon gas streams.

3. The process of claim 1 in which the period of time for which the hydrocarbons are at their conversion temperature while out of contact with the air is so controlled as to effect a partial pyrolysis of the hydrocarbons without substantial carbon liberation.

GEORGE L. HELLER.

REFERENCES CITED

The following references are of record in the file of this patent:

UNITED STATES PATENTS

| Number | Name | Date |
|---|---|---|
| 1,738,716 | Matlock | Dec. 10, 1929 |
| 1,902,753 | Beaver | Mar. 21, 1933 |
| 1,904,469 | Keller | Apr. 18, 1933 |
| 1,999,541 | Keller | Apr. 30, 1935 |
| 2,114,738 | Heller et al. | Apr. 19, 1938 |
| 2,144,971 | Heller et al. | Jan. 24, 1939 |
| 2,238,576 | Heller | Apr. 15, 1941 |
| 2,375,795 | Krejci | May 15, 1945 |
| 2,418,475 | Loving | Apr. 8, 1947 |